United States Patent Office 3,413,268
Patented Nov. 26, 1968

3,413,268
USE OF AMINOALKYLAMINO-s-TRIAZINES AS HARDENING AGENTS FOR EPOXY RESINS AND HARDENED EPOXY RESIN
Hans Feichtinger, Dinslaken, and Werner Raudenbusch, Oberhausen-Sterkrade, Germany, assignors to Ruhrchemie Aktiengesellschaft, Oberhausen-Holten, Germany
No Drawing. Filed Nov. 29, 1966, Ser. No. 597,571
Claims priority, application Germany, Dec. 3, 1965, R 42,127; Dec. 30, 1965, R 42,340
5 Claims. (Cl. 260—47)

Hardening compositions on the basis of epoxide resins, containing amines as hardening agents are known in the art. (See for instance R. Wegler in Houben-Weyl, "Methoden der organischen Chemie," fourth edition, vol. 14/2 (1963), p. 517/518.) The tertiary amines, hitherto used as hardening agents, effect under the influence of heat, especially at temperatures between 80 and 120°, a complete hardening (curing) of the epoxide resin compositions. Since they possess high reactivity, even at room temperature, liquid compositions of commercially available epoxide resins become highly viscous, even after 1 to 6 hours, so that they can no longer be processed. Since the pot life is especially important for the use of the compositions in the art of casting resins and varnishes, the rapid increase in viscosity is very disadvantageous.

Therefore, it is highly desirable and is an object of the invention, to provide hardening compositions on the basis of epoxide resins, remaining processable over extended periods.

These and other objects of the invention are achieved by hardening compositions, which consist of a mixture of commercially available epoxide resins and at least one aminoalkylamino-s-triazine of the formula

wherein each $R^1$ is either hydrogen, a lower alkyl radical, e.g. normal or branched alkyl radical having 1 to 4 carbon atoms, an aryl radical, especially a mono nuclear aryl radical as for instance phenyl- or tolyl-radicals, or a primary amino radical, or a lower mono- or dialkylamino radical such as for example methyl, ethyl, or propyl dimethyl, or diethyl amino; each $R^2$ is either hydrogen, a normal or branched alkyl radical having 1 to 12 carbon atoms, an aryl radical, especially a mono nuclear aryl radical; and each $R^3$ and $R^4$ is an alkyl radical of up to 8 carbon atoms, e.g. either normal or branched alkyl radical having 1 to 4 carbon atoms or $R^3$ and $R^4$ belong to a common nitrogen containing ring system, e.g. both $R^3$ and $R^4$ are alkylene such as for example polymethylene, and the terminal free bonds are joined by $CH_2=$, $O=$, or $N=$; $n$ is an integral number and is 1 or 2. Where $R^3$ and $R^4$ are part of a ring system, the ring system includes the nitrogen to which the alkylene groups are bonded and can be piperidino, morpholino, or piperazino.

The compositions of this invention contain amounts of the hardening agent as are known in the art for epoxy resin hardening agents. The compositions can contain 2–25%, preferably 2 to 10% by weight of the aminoalkylamino-s-triazine depending on the amount of epoxy resin in the composition.

In spite of their catalytically highly active groups, as for instance dialkylamino- or piperidino-groups, the aminoalkylamino-s-triazines of this invention possess at room temperature only a very low reactivity with the polyepoxide compounds, so that the compositions comprising the hardening agent and uncured epoxy resin possess very extended "pot life." Probably, this advantageous behavior refers to the arrangement of the dialkylamino- and piperidino-groups respectively of the said compounds in a N.N-acetal like constitution.

At ambient temperature the compositions of this invention remain flowable and easily processable for 5 to 21 days. By heating up to 80 to 120° C. for ½ to 2 hours, they can be completely hardened, i.e. cured. Thus, in spite of the extended storage life at ambient temperature, hardening occurs as quick as with the N.N-dimethylalkylamines hitherto used for this purpose. The quality of the hardened products is independent of the storage time of the initial compositions.

Liquid, as well as solid epoxide resins, are suited as starting materials for the compositions according to the invention. For instance liquid bisphenol-A-diglycidyl ethers, having an epoxide equivalent of 170 to 210 and viscosities of 11,000 to 16,000 cp. (at 25°) can be used. As solid resin types, for instance commercially available bisphenol-A-diglycidyl ethers having an epoxide equivalent from 470 to 550 and melting points from 60 to 80° C. are suited.

Especially valuable hardening agents are aminoalkylamino-s-triazines, wherein $R^1$ represents a phenyl, methyl- or primary amino radical, each $R^2$ an isopropyl radical, each $R^3$ and $R^4$ a methyl radical, and wherein $n$ is 2. The compositions according to the invention are prepared by intensive mixing of the components at room temperature or slightly increased temperature up to about 50°, for instance with the aid of ball mills.

Depending upon the structure of the hardening agent, very fine suspensions or clear solutions respectively thereof in the epoxide resin are thereby obtained. In every case, at least at heating of the compositions of resin and hardening agent up to temperatures of about 50° and higher, a rapid dissolution of the suspended hardening agent occurs. The composition becomes temporarily highly fluid and solidifies at further heating to 80–120° C. to a clear, transparent polymerizate, which has excellent mechanical and electrical properties and shows an extraordinary small shrinkage.

Organic solvents can be added to the compositions of the invention, especially if they are prepared from solid polyepoxide resins. The quantity of the solvent is not critical, it depends upon the respective applicability of the compositions and can amount to 10 to 2000% by weight of the quantity of the epoxide resin. The use of solvents in the preparation of the compositions is especially effective, if they are to be used as reactive varnishes or coatings. In this manner, highly fluid, clear solutions are obtained, which likewise possess pot lives up to several weeks. Under these conditions, for instance commercially available solid bisphenol-A-diglycidylethers with epoxide equivalents of about 500 and melting points of 60 to 70° C. can be used. Preferred solvents are those known for use as solvents for solid epoxy resins, for example aromatic hydrocarbons, ethers, dioxane, polyethyleneglycols, ketones and esters; lower alcohols, diols and ketoalcohols may also be employed. The solvents are used in conventional amounts.

Hardening accelerators known in the art can be additionally incorporated into the compositions according to the invention, as for instance alcohols, diols, mono- or multivalent phenols, carboxylic acid amides, in amounts customary in the art of casting resins and varnishes. These compounds are generally added shortly before the hardening. Convenient reinforcing materials, fillers, plasticizers, pigments and colorants can also be added to the compositions according to the invention, in order to improve their mechanical properties and to influence their appearance.

The compositions according to the invention can be used for instance as casting resins for electro engineering purposes, in the field of the manufacture of apparatus and tools, for preparation of lacquers and adhesives for uniting metals, glass, wood, and plastics.

For the preparation of the hardening compositions according to the invention commercially available epoxide resins are mixed with aminoalkylamino-s-triazines, prepared by reaction of amino-s-triazines of the formula $$R^1{}_{3-n}[C_3N_3](NH_2)_n$$

with aldehydes of the formula $$R^2CHO$$

and secondary amines of the formula $$HN(R^3)(R^4)$$

in the basic medium in presence of water to homogeneous compounds of the general formula $$R^1{}_{3-n}[C_3N_3][NHCH(R^2)N(R^3)(R^4)]_n$$

whereby $R^1$, $R^2$, $R^3$, $R^4$ and $n$ have the same significance as hereinbefore mentioned.

If isobutyraldehyde is used as aldehyde component, the reaction according to the invention occurs with particularly favorable results.

It is indeed known, that NH-compounds as for instance amines, carboxylic acid amides, urethanes, imides, lactams or ureas can be aminoalkylated with aldehydes and secondary amines in an aqueous basic medium (see for instance Hellmann and Opitz "α-Aminoalkylierung," publishing house Chemie, 1960, p. 49 ff.). Formaldehyde is generally used as the aldehyde component, since in the case of higher aldehydes side reactions, as for instance Knoevenagel condensations, aldolization, formation of enamines as well as steric hindrance are observed (see Hellmann and Opitz, loc. cit., p. 4). The side reactions restrict the use of higher aldehydes for these α-aminoalkylation reactions.

Aminotriazines as for instance 2,4-diamino-s-triazine, melamine, acetoguanamine, benzoguanamine and other guanamines have not been previously reacted as NH-compounds with aldehydes and secondary amines, since such reactions, due to the poor solubility of conventional amino-s-triazines as well as to the well known thermal instability of the aminoalkylation derivatives of aldehydes having hydrogen atoms in α-position, did not appear feasible (see Hellmann and Opitz, loc. cit., pp. 7 and 8).

The process according to the invention has made it possible to obtain well defined, crystalline aminoalkylation products from amino-s-triazines hereinbefore mentioned. It is highly surprising, that in spite of the poor solubility of the starting materials and the end products of the reaction, that the reactants are converted in a stoichiometric ratio, whereby nearly theoretical yields are obtained.

The amino-s-triazines are reacted with aldehydes and secondary amines in heterogenous phase at temperatures from 20 to 100° C.

In order to conduct the reaction as cautiously as possible it is preferably effected at ambient or slightly elevated temperature, for instance in the range between 20 and 50° C. Low reaction temperatures are especially well suited if aldehydes with hydrogen atoms in α-position are used as starting materials, since the compounds produced by the invention are easily decomposed as is the case with such N.N-acetals (see Hellmann and Opitz, loc. cit., pp. 7 and 8). Compounds, prepared from amino-triazines, aldehydes, having no hydrogen atoms in α-position and secondary amines, possess higher stabilities.

Especially if the hereinbefore mentioned less stable reaction products are prepared, it is preferred to react aldehyde and secondary amine respectively in excess, advantageously up to about 50% above the theoretically required amount. It is of further advantage, to add an organic solvent, miscible with water, to the reaction mixture, in order to improve the solubility of the reactants. Dioxane, tetrahydrofurane, dimethylformamide, dimethylsulfoxide, glycoldimethylether are well suited as solvents.

The amounts of water and solvent are not critical, they can vary in broad limits, for instance in the range from 5 to 20 moles of water plus solvent/mole of the aminotriazine compounds, preferably from 10 to 15 moles/mole of the aminotriazine component are used.

As the starting materials as well as the end products are difficultly soluble compounds, the reaction is advantageously effected under intimate admixture of the reactants, for instance in a ball mill.

The solid reaction product is thereafter separated from the liquid, for instance by suction filtration, washed with water or with a volatile organic solvent, miscible with water, and dried, preferably in the atmosphere at ambient temperature.

The aminoalkylamino-s-triazines according to the invention are colorless, crystalline compounds, melting under decomposition and are difficultly soluble in water and most organic solvents. With the process according to the invention, the products are obtained sufficiently pure so that they can be used without further processing. If extraordinary pure products are desired, the primary reaction product can be recrystallized from ether-like solvents, as for instance dioxane or glycoldimethylether. Hereby it is advantageous to maintain low temperatures in order to prevent any decomposition.

The aminoalkylamino-s-triazines are not only excellent hardeners, but they are also valuable intermediate products for organic synthesis, especially in the field of the pharmaceutical industry. Further, they can be used as fertilizer since they slowly liberate nitrogen and therefore represent depot fertilizers, remaining available over extended periods.

As the compounds of the invention derived from aldehydes with hydrogen atoms in α-position comparatively easily liberate the basic component they can be used as storing substances for the said secondary bases.

The following non-limiting examples are given as certain preferred embodiments of the invention. They refer to the preparation of the novel aminoalkylamino-s-triazines as well as to the hardening compositions on the basis of epoxide resins.

The following table contains a comparison of several physical properties of objects, obtained by hardening liquid bisphenol-A-diglycidylethers with conventional tertiary-amine hardening agents and aminoalkylamino-s-triazines according to the invention respectively. As is seen therefrom, the objects prepared from the compositions according to the invention possess comparable and even better properties.

The test values given in the table are determined with test bodies obtained in the following manner:

6% of one mole equivalent of the hardening agent based on the dimethylamino groups were suspended or dissolved in 190 g. of a commercially available bisphenol-A-diglycidylether with an epoxide equivalent of 190. The compositions so obtained, after the storing times mentioned in the examples, were cast in iron moulds of 130 x 65 x 18 mm. and maintained for 3 hours at 100° C. The values given in the table were determined according to the following DIN standards, i.e. "Deutscher Verband der Material-prüfungen der Technik":

Tensile strength and elongation according to DIN 53,455;
Flexural strength and deflection according to DIN 53,452;
Impact strength according to DIN 53,453;
Ball indentation according to DIN 53,456;
Resistance to heat according to DIN 53,462;
Dissipation factor according to DIN 53,483.

The so-called Erichsen-cupping values, mentioned in the examples, were determined according to DIN 53,156, the pencil hardness according to the method of Wolff-Wilborn.

TABLE

|  | N.N-dimethyl-benzylamine | 2.4.6-tris-(dimethyl-aminomethyl)-phenol | Aminoalkylamino-s-triazine according to example | | |
|---|---|---|---|---|---|
|  |  |  | 1 | 2 | 3 |
| Tensile strength (kp./cm.²) | 720 | 475 | 815 | 850 | 835 |
| Elongation, percent | 10.9 | 5.5 | 11.5 | 12.0 | 11.4 |
| Flexural strength (kp./cm.²) | 1,280 | 1,450 | 1,310 | 1,400 | 1,260 |
| Deflection at rupture (mm.) | 15 | 14.8 | 15 | 11.8 | 15 |
| Impact strength (kp. cm./cm.²) | 3 | 35 | 79 | 36 | 53 |
| Ball indentation (kp./cm.²) | 860 | 1,100 | 1,135 | 1,225 | 1,225 |
| Resistance to heat (Martens-temperature) (° C.) | 81 | 80 | 83 | 85 | 79 |
| Dissipation factor (at 100 kHz.) (tg.) | 7.10⁻³ | 5.10⁻³ | 4.10⁻³ | 4.10⁻³ | 4.10⁻³ |
| Pot life at room temperature, hrs. | 4 | 1 | 500 | 350 | 120 |
| Gel time at 100° C. (min.) | 60 | 30 | 50–60 | 70 | 50 |

EXAMPLE 1

126 g. (1.0 mole) melamine, 216 g. (3.0 moles) isobutyraldehyde and 410 g. (3.0 moles) of a 33% aqueous solution of dimethylamine were treated for 4 days at ambient temperature in a closed ball mill (porcelain balls), having a capacity of 2 liters with 80 to 100 rotations per minute. The colorless reaction product was separated from the liquid by suction, washed with acetone and dried in the atmosphere. 310 g. of a snow white powder having a melting point of 165 to 170° C. (decomposition), 96% of the theoretical amount, were obtained. By recrystallization from glycoldimethylether of 50° C., the pure compound having the formula

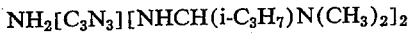

$$NH_2[C_3N_3][NHCH(i-C_3H_7)N(CH_3)_2]_2$$

was obtained. Its melting point was 175 to 176° C. (decomposition). It was determined by analysis, that 2 moles isobutyraldehyde and 2 moles dimethylamine per mole melamine were converted.

29 g. (0.09 mole) of the colorless, finely powdered raw product and 570 g. (3 epoxide equivalents) of a commercially available bisphenol-A-diglycidylether (viscosity 11,000 cp. at 25° C.) were intimately admixed for 6 hours in a ball mill (porcelain balls), having a capacity of 1.5 liters, with 80 to 100 rotations per minute at a temperature of 30 to 40° C. A very fine homogenous pale yellow suspension was obtained, which at room temperature remained flowable and processable for 3 weeks. By heating for 15 minutes to 100 to 120° C. it was converted to a clear, highly fluid mass, which was cast into iron moulds of 130 x 65 x 18 mm. After further heating for 45 minutes at 100° C., the composition gelled; thereafter it was thoroughly hardened by heating for two hours at 100° C. The amber colored cast bodies hereby obtained were clear, free of bubbles and showed practically no shrinkage. Their properties are listed in column 4 of the table.

EXAMPLE 2

125 g. (1.0 mole) acetoguanamine, 216 g. (3.0 moles) isobutyraldehyde and 410 g. (3.0 moles) of a 33% aqueous solution of dimethylamine were converted in the manner described in Example 1 and yielded 316 g. of a snow white powder having a melting point of 161 to 164° C. (decomposition). This corresponds to 99% of the amount to be theoretically expected. By recrystallization from glycoldlimethylether the pure compound of the formula

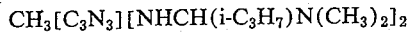

$$CH_3[C_3N_3][NHCH(i-C_3H_7)N(CH_3)_2]_2$$

was obtained, which melted between 165 to 167° C. under decomposition. 735 mg. (2.25 mmoles) of this compound were boiled for 2 hours in 30 ml. water, whereby 4.45 moles of dimethylamine were split off, which was quantitatively blown out by nitrogen, absorbed in 0.1 N sulfuric acid and converted with p-toluene-sulfonylchloride to crystalline N.N-dimethyl-p-toluene sulfonic acid amide having a melting point of 79 to 80° C.

29 g. (0.090 mole) of the said snow white powder compound were suspended in 570 g. (3 epoxide equivalents) of a commercially available bisphenol-A-diglycidylether as described in Example 1. At room temperature, the light yellow suspension remained castable for longer than 2 weeks. By heating for 10 minutes to 80 to 90° C. with stirring the suspended substance was completely dissolved; it gelled after heating for 1 hour to 100° C. The physical properties of the cast bodies, which had further been hardened for two hours at 100° C. are listed in the table. The hardened cast bodies were bubble free, transparent and showed practically no shrinkage.

EXAMPLE 3

187.2 g. (1.0 mole) benzoguanamine ($n$ is 2; $R^1$ is phenyl), 216 g. (3.0 mole) isobutyraldehyde and 337 g. (3.0 moles) of a 40% aqueous dimethylamine solution were converted as described in Example 1. After a reaction period of 2 days, followed by drying of the raw reaction product at room temperature, 370 g. (97% of the amount to be theoretically expected) of a crystalline, colorless powder having a melting point of 80–85° C. were obtained. By recrystallization from glycol dimethylether the analytically pure substance of formula

$$C_6H_5[C_3N_3][NHCH(i-C_3H_7)N(CH_3)_2]_2$$

having a melting point of 100° C. (decomposition) was obtained.

70 g. (0.18 mole) of the colorless, fine crystalline raw product and 1140 g. (6 epoxide equivalents) of the epoxide resin described in Example 1 were rotated in a 2 liter ball mill (porcelain balls) at 35° C. for 3 hours with about 80 rotations per minute. The clear solution of the aminoalkylamine-s-triazine so obtained was stored at room temperature for 5 days and thereafter heated to 100° C. At heating it gelled in a period of less than 1 hour. Cast bodies thereof, hardened for three hours at 100° C., were light yellow, clear and showed no shrinkage. Their physical properties are listed in the table.

EXAMPLE 4

125 g. (1.0 mole) acetoguanamine, 318 g. (3.0 moles) benzaldehyde and 337 g. (3.0 moles) of a 40% aqueous dimethylamine solution were reacted in the manner described in Example 1. After a reaction time of 3 days, filtering by suction and washing with much water, 250 g. of a white powder, having a melting point of 180–182° C. (decomposition), were obtained. This corresponds to 97% of the theory. The analysis of the product recrystallized from dioxane having a melting point of 190–192° C. (decomposition) showed, that 1 mole benzaldehyde and 1 mole dimethylamine per mole acetoguanamine had been converted. Therefore, the compound thereby obtained had the formula

$$CH_3[C_3N_3](NH_2)[NHCH(C_6H_5)N(CH_3)_2]$$

46.5 g. (0.18 mole) of the finely pulverized raw product were suspended in 570 g. (3 epoxide equivalents) of the epoxide resin mentioned in Example 1 as there described. The suspension so obtained remained castable when stored at room temperature for 3 weeks and thereafter gelled at 120° C. during one hour. After further heating for two hours to 120° C. it yielded bodies with good mechanical properties which showed no shrinkage.

EXAMPLE 5

5 g. (0.015 mole) of the aminoalkylamino-s-triazine according to Example 2 were dissolved at room temperature in 100 ml. of a mixture of equal volumes of diacetone alcohol, n-butanol and toluene. In this solution of the hardening agent 100 g. (0.195 epoxide equivalents) of a commercially available solid bisphenol-A-diglycidylether having a melting point of 62 to 65° C. and an epoxide equivalent of 512, were dissolved. The clear homogeneous composition so obtained could easily be painted and remained highly fluid for more than 1 week at room temperature. It was spread with a brush on 0.5 mm. thick iron sheets, which had been sandblasted. After hardening for two hours at 100° C., undiscolored 20 to 50μ thick films of bright luster were obtained, which showed a scratch resistance of 6 to 7 H (pencil scale). The films possessed a very good adhesive and flexural strength, their Erichsen cupping values amounted to 6 to 8 mm.

EXAMPLE 6

16 g. (0.042 mole) of the aminoalkylamino-s-triazine prepared according to Example 3 were dissolved at room temperature in 16 ml. methylethylketone. A solution of 200 g. (0.39 epoxide equivalents) of the solid resin mentioned in Example 5 in 80 ml. methylethylketone was added thereto. A clear, homogeneous mixture of resin and hardening agent was obtained, which, when stored at room temperature, remained liquid and paintable for 1 week. As described in Example 5, the said mixture was spread on iron sheets and hardened for two hours at 100° C. The films thereby obtained showed a bright luster and remained undiscolored. They had a scratch resistance of 6 H (pencil scale) and a very good adhesive and flexural strength.

The following examples illustrate the preparation of further aminoalkylamino-s-triazines, which can also be used for the preparation of hardening compositions according to the invention or can serve for the other purposes hereinbefore described.

EXAMPLE 7

126 g. (1.0 mole) melamine, 216 g. (3.0 moles) isobutyraldehyde, 261 g. (3.0 moles) morpholine and 200 ml. water were reacted according to the process described in Example 1. After rotation in a ball mill for 3 days and drying of the reaction mixture thereby obtained for several days at the atmosphere, 340 g. of a colorless pulverizable compound of the formula $$NH_2[C_3N_3][NHCH(i-C_3H_7)N(CH_2CH_2)_2O]_2$$

were obtained, which, after recrystallization from heated dioxane melted at 173 to 175° C. This yield amounted to 82% of the theoretical quantity. It was determined by analysis, that 2 moles isobutyraldehyde and 2 moles morpholine per mole melamine had been converted.

EXAMPLE 8

17.0 g. of a 38% formaline solution (0.21 mole), 18.0 g. (0.21 mole) piperidine and 40 ml. water were admixed and 12.5 g. (0.1 mole) acetoguanamine added thereto. The admixture was stirred at 80° C. on a water bath, whereby after 15 minutes a crystalline precipitate deposited out of the nearly clear solution. After further heating for 1 hour the crystalline precipitate was separated by filtration, washed with water and dried at the atmosphere. 28 g. of a compound having the formula $$CH_3[C_3N_3][NHCH_2NC_5H_{10}]_2$$

having a melting point of 175° C. (decomposition) were obtained. This corresponds to 88% of the theoretical yield. It was determined by analysis, that 2 moles formaldehyde and 2 moles piperidine had reacted with 1 mole acetoguanamine.

EXAMPLE 9

125 g. (1.0 mole) acetoguanamine, 426 g. (3.0 moles) 3.5.5-trimethyl caproaldehyde and 410 g. aqueous 33% dimethylamine solution (3.0 moles) were admixed for 5 days as described in Example 1. The colorless, solid reaction product, after having been slowly dried in the atmosphere, melted at 150° C. (decomposition). It was recrystallized from warm dioxane, whereby the pure composition of the formula $$CH_3[C_3N_3](NH_2)[NHCH(CH_2CH(CH_3)CH_2C(CH_3)_3)N(CH_3)_2]$$

was obtained, which melted at 168 to 170° C. under decomposition. It was determined by ultimate analysis, that 1 mole 3.5.5-trimethyl caproaldehyde and 1 mole dimethylamine had been converted per mole acetoguanamine.

EXAMPLE 10

62.5 g. acetoguanamine (0.50 mole) were added at room temperature all at once under stirring to a mixture of 129 g. (1.0 mole) di-n-butylamine and 80 g. (1.0 mole) of 38% aqueous formaline solution, and the composition further stirred at room temperature for one hour. It was then heated for 2 hours at 70 to 80° C., whereby it became temporarily near clear. Thereafter a white, solid substance precipitated, which after cooling to 0° C. was filtrated off by suction, washed with water and dried for a longer time at the atmosphere. 130 g. of a white crystalline powder were obtained, which corresponds to 98% of the quantity, theoretically to be expected. After recrystallization from glycoldimethylether it had a melting point of 225–227° C. (decomposition). By analysis it was determined, that 1 mole formaldehyde and 1 mole di-n-butylamine had been converted per mole of acetoguanamine. The product compound had the formula $$CH_3[C_3N_3](NH_2)[NHCH_2N(n-C_4H_9)_2]$$

The aminoalkylamino-s-triazines specified in claim 1 hereof, epoxy resin hardened with such triazines, and the disclosed process for preparing the triazines, are the subject of application Ser. No. 753,317, filed Apr. 1, 1968 as a division of the instant application.

What is claimed is:

1. Process of producing a hardenable epoxy resin composition which comprises combining an uncured epoxy resin having more than one 1,2-epoxide group per molecule and, as hardening agent therefor, aminoalkylamino-s-triazine of the formula:

$$R^1{}_{3-n}[C_3N_3][NHCH(R^2)N(R^3)(R^4)]_n$$

wherein $n$ is an integral number and is 1 or 2, each $R^1$ is a hydrogen, lower alkyl, aryl, primary amino radical, mono-lower alkyl amino or di-lower alkyl amino radical, each $R^2$ is a hydrogen, alkyl of up to 12 carbon atoms, or aryl radical, and $R^3$ and $R^4$ is each an alkyl radical or both are alkylene radicals with the proviso that when $R^3$ and $R^4$ are alkylene radicals, the terminal free bonds of said radical are joined by $CH_2\!\!=\!\!$, $O\!\!=\!\!$, or $N\!\!=\!\!$.

2. Process according to claim 1, wherein the hardening agent is used in amount of about 2–25% by weight of the resulting hardenable resin composition.

3. Process according to claim 1, wherein the hardening agent is used in amount of about 2–10% by weight of the resulting hardenable resin composition.

4. Process of producing a hardened epoxy resin which comprises combining an uncured epoxy resin having more than one 1,2-epoxide group per molecule and, as hardening agent therefor, aminoalkylamino-s-triazine of the formula:

$$R^1{}_{3-n}[C_3N_3][NHCH(R^2)N(R^3)(R^4)]_n$$

wherein $n$ is an integral number and is 1 or 2, each $R^1$ is a hydrogen, lower alkyl, aryl, primary amino radical, mono-lower alkyl amino or di-lower akyl amino radical, each $R^2$ is a hydrogen, alkyl of up to 12 carbon atoms, or aryl radical, and $R^3$ and $R^4$ is each an alkyl radical or both are alkylene radicals with the proviso that when $R^3$ and $R^4$ are alkylene radicals, the terminal free bonds of said radical are joined by $CH_2=$, $O=$, or $N=$, and curing the composition to harden the resin.

5. Hardened epoxy resin produced by the method of claim 4.

References Cited

UNITED STATES PATENTS 3,030,247  4/1962  Schurb.

WILLIAM H. SHORT, *Primary Examiner.*

T. D. KERWIN, *Assistant Examiner.*